United States Patent [19]

Pollman et al.

[11] Patent Number: 5,446,386

[45] Date of Patent: Aug. 29, 1995

[54] MOLDED CASE CIRCUIT BREAKER AUXILIARY POWER SUPPLY PLUG

[75] Inventors: John A. Pollman, Seymour; Daniel J. DellaVecchia, Cheshire; Ira B. Goldman, Waterbury; John T. Lewandoski, Terryville; Paul T. Rajotte, Plainville, all of Conn.

[73] Assignee: General Electric Company, New York, N.Y.

[21] Appl. No.: 23,460

[22] Filed: Feb. 26, 1993

[51] Int. Cl.6 .................. G01R 31/02; G01R 31/32
[52] U.S. Cl. .................. 324/424; 335/132; 335/202; 361/93
[58] Field of Search .......... 324/424, 158 R, 509, 324/133, 696; 335/6, 18, 132, 202, 45; 361/93–96; 340/638; 364/480, 483, 492

[56] References Cited

U.S. PATENT DOCUMENTS

| | | | |
|---|---|---|---|
| 2,581,308 | 1/1952 | Smith | 340/638 |
| 3,532,967 | 10/1970 | Milton et al. | 324/424 |
| 3,828,256 | 8/1974 | Liu | 324/133 |
| 4,006,409 | 2/1977 | Adams | 324/133 X |
| 4,020,417 | 4/1977 | Brehob et al. | 324/696 X |
| 4,728,914 | 3/1988 | Morris et al. | 335/6 |
| 4,740,745 | 4/1988 | Sainz | 324/133 X |
| 4,754,247 | 6/1988 | Raymont et al. | 335/202 |
| 4,803,434 | 2/1989 | Walker | 324/424 |
| 4,814,712 | 3/1989 | Burton et al. | 324/424 |
| 4,982,173 | 1/1991 | Meiners et al. | 335/21 |
| 5,008,626 | 4/1991 | Boyd, Sr. | 324/133 X |
| 5,173,833 | 12/1992 | Hirotsune et al. | 361/94 |
| 5,272,483 | 12/1993 | Stumme | 324/424 |

FOREIGN PATENT DOCUMENTS 641585  1/1979  U.S.S.R. .................. 340/638

*Primary Examiner*—Sandra L. O'Shea
*Assistant Examiner*—Jay M. Patidar
*Attorney, Agent, or Firm*—Richard A. Menelly

[57] ABSTRACT

A molded case circuit breaker containing a digital trip unit is field-tested for both electronically-induced as well as mechanically-induced test conditions by means of a portable test kit unit. The test kit circuit components are contained within a miniature test plug that temporarily connects with the circuit breaker trip unit by insertion within the rating plug receptacle formed within the circuit breaker cover. A compact power supply plug is received within the test plug to provide operating power to the circuit breaker trip unit components and associated accessories.

1 Claim, 4 Drawing Sheets

MOLDED CASE CIRCUIT BREAKER AUXILIARY POWER SUPPLY PLUG

BACKGROUND OF THE INVENTION

Molded case industrial-rated circuit breakers such as described within U.S. Pat. No. 4,982,173 employ a pair of separable contacts and an operating mechanism wherein the contacts are restrained from being driven to their open position against the bias of a pair of powerful operating mechanism springs under quiescent circuit current conditions. The digital trip unit within the circuit breaker cover signals the circuit breaker trip actuator to release the contacts and allow them to rapidly move to their open positions upon the occurrence of an overcurrent condition. The mechanical trip test button on the circuit breaker cover allows manual application of a trip force to the operating mechanism which bypasses the trip actuator and articulates the operating mechanism to separate the contacts in the absence of any overcurrent conditions to ensure that the operating mechanism is operating properly.

U.S. Pat. No. 4,814,712 describes an electronic test kit for providing an electrical signal to the trip actuator unit within the circuit breaker cover within higher rated industrial circuit breakers to articulate the operating mechanism to ensure that the trip actuator unit per se is operating properly. The test kit circuit electrically connects with the digital trip unit within the circuit breaker by means of a test jack opening in the rating plug that is contained within a receptacle formed within the circuit breaker cover. The inclusion of a microprocessor within the test kit circuit allows the test kit to perform several additional functions besides activating the trip actuator.

It has been found beneficial to regularly operate the trip actuator to redistribute the lubricating grease employed with the movable components as well as to ensure that the trip actuator is operational. With the lower rated industrial circuit breakers, described earlier, it is not economically feasible to employ the multifunctional test kit unit employed with the higher-rated industrial circuit breakers.

Accordingly, one purpose of this invention is to provide a simple inexpensive test plug that is capable of energizing the trip actuator within lower rated industrial circuit breakers to insure operation and to beneficially redistribute the lubricating grease in the manner described earlier.

SUMMARY OF THE INVENTION

A compact test plug containing electronic trip test components is adapted to fit within the rating plug receptacle formed within a molded case circuit breaker cover. A miniature power supply is received within a top part of the test plug to provide operating power to the test plug components. The test plug also tests a circuit breaker bell alarm accessory that is contained within the circuit breaker cover.

DESCRIPTION OF THE PREFERRED EMBODIMENT

Figure 1:
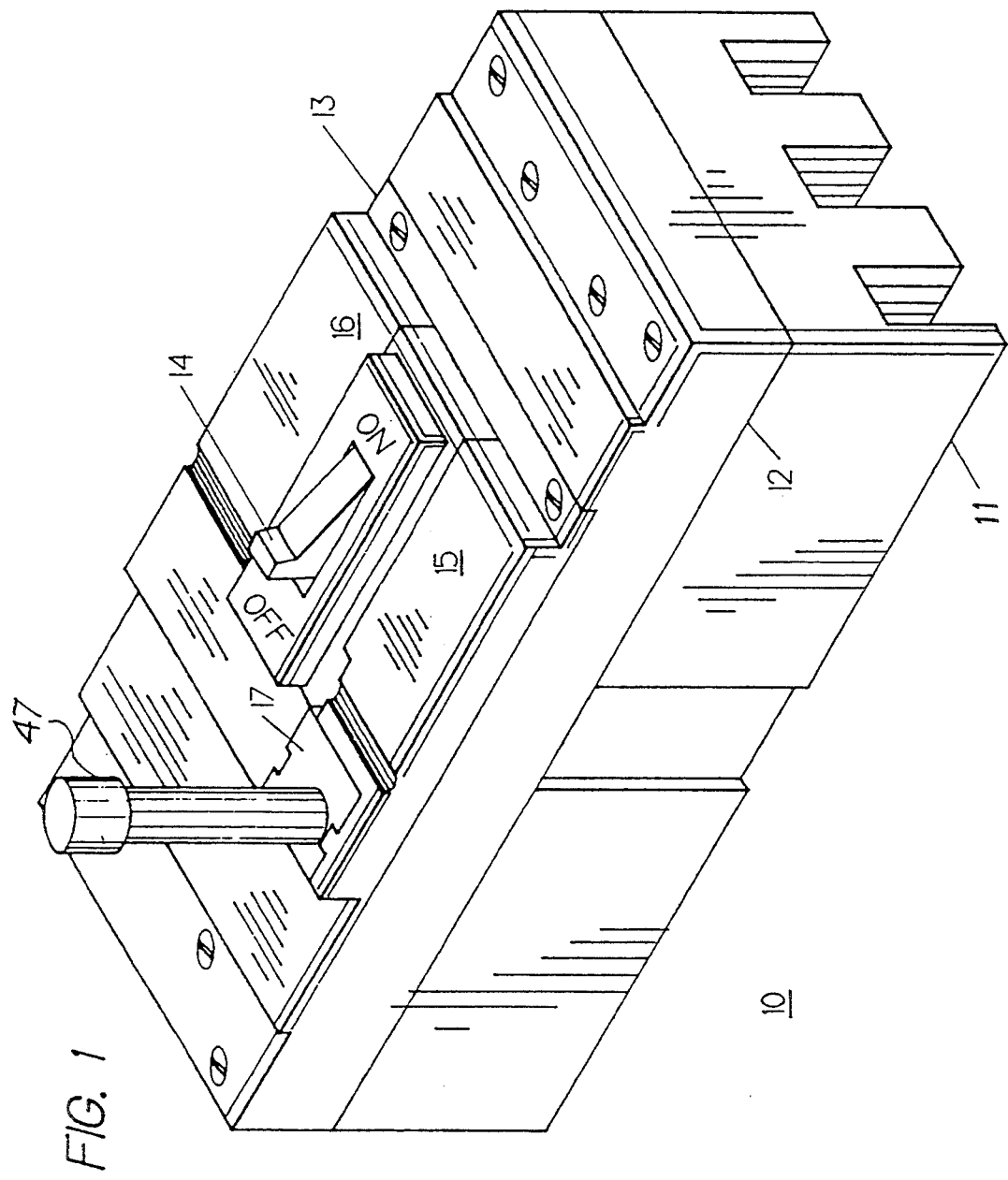
FIG. 1 is a top perspective view of a molded case circuit breaker employing a digital trip unit and having the test plug attached in accordance with the invention.
Figure 2:
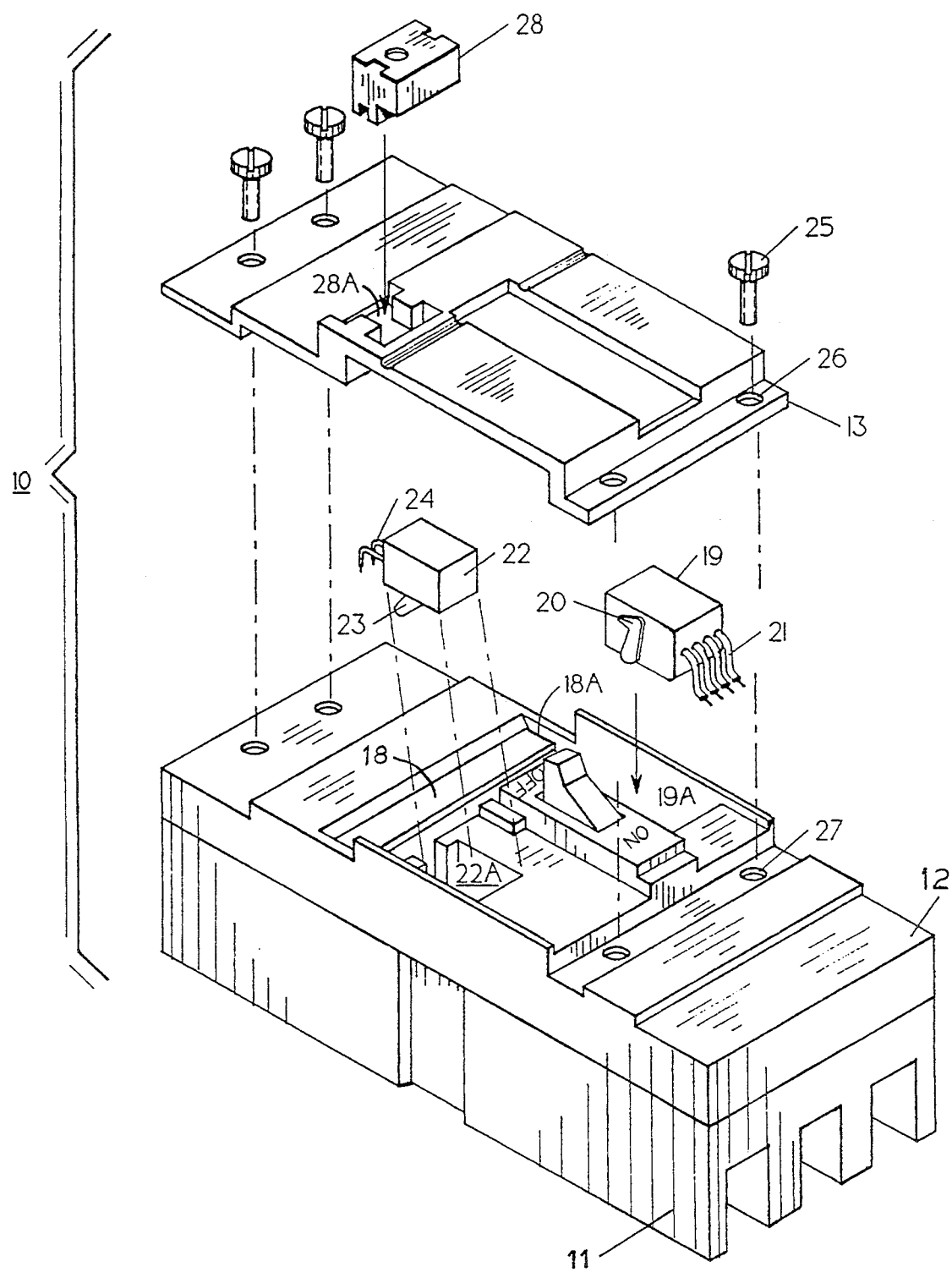
FIG. 2 is a top perspective view of the circuit breaker of FIG. 1 with the accessory cover and accessory components in isometric projection.

An integrated molded case circuit breaker 10 having a molded plastic case 11 with a molded plastic cover 12 fixedly attached is depicted in FIG. 1 with the accessory cover 13 attached to the circuit breaker cover and with the operating handle 14 projecting through the circuit breaker cover for turning the circuit breaker contacts (not shown) between their on and off conditions. As described within U.S. Pat. No. 4,754,247 a pair of accessory doors 15, 16 allow field access to the accessory components located under the doors. The circuit breaker 10 is in a test mode whereby a test plug 17 and miniature auxiliary power plug 47 are inserted within the rating plug recess 28A which is best seen by referring to the circuit breaker 10 shown in FIG. 2 prior to attaching the cover 12 to the case 11.

The rating plug 28, shown in place of the test plug 17, is usually inserted within the rating plug recess 28A for connection with the trip unit circuit board 18 in the trip unit recess 18A and hence becomes part of the trip unit circuit. The actuator unit 19 having an actuator arm 20 interacting with the circuit breaker operating mechanism (not shown) and wire conductors 21 electrically connecting with the trip unit circuit board is operably positioned within the actuator recess 19A. A good description of the actuator unit is found in the aforementioned U.S. Pat. No. 4,754,247. An accessory unit such as an auxiliary switch 22, positioned in the accessory recess 22A, interacts with the circuit breaker operating mechanism by means of a lever 23 and connects with an external circuit by means of conductors 24. The accessory cover 13 is attached to the circuit breaker cover 12 by means of screws 25, thru-holes 26 and threaded openings 27. As described within U.S. Pat. No. 4,728,914, the rating plug 28 inserted within the rating plug recess 28A sets the circuit breaker rating when electrically connected with the trip unit printed wire board 18.

Figure 3:
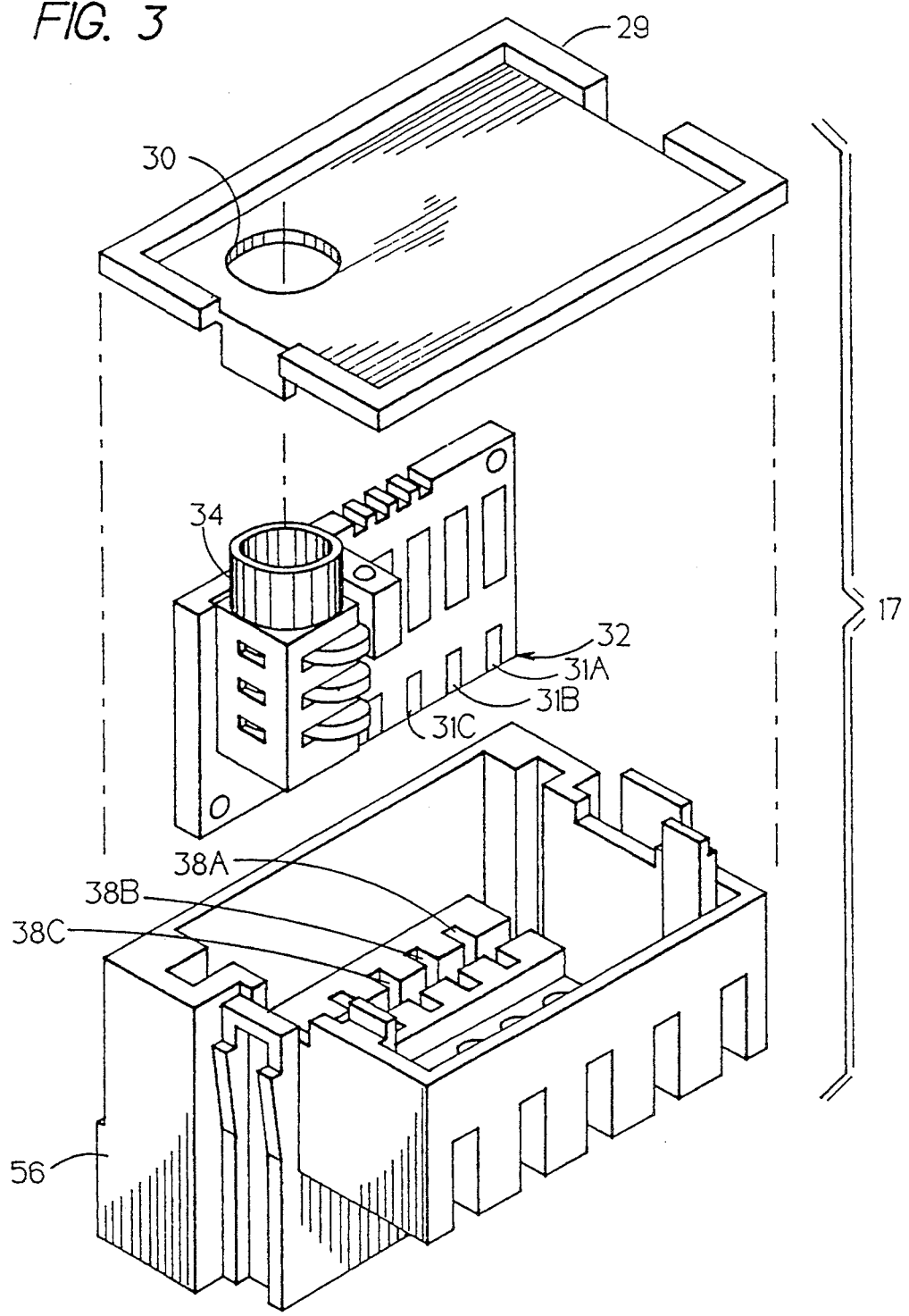
FIG. 3 is an enlarged top perspective view of the test plug of FIG. 1 with the cover and printed circuit board in isometric projection.
Figure 4:
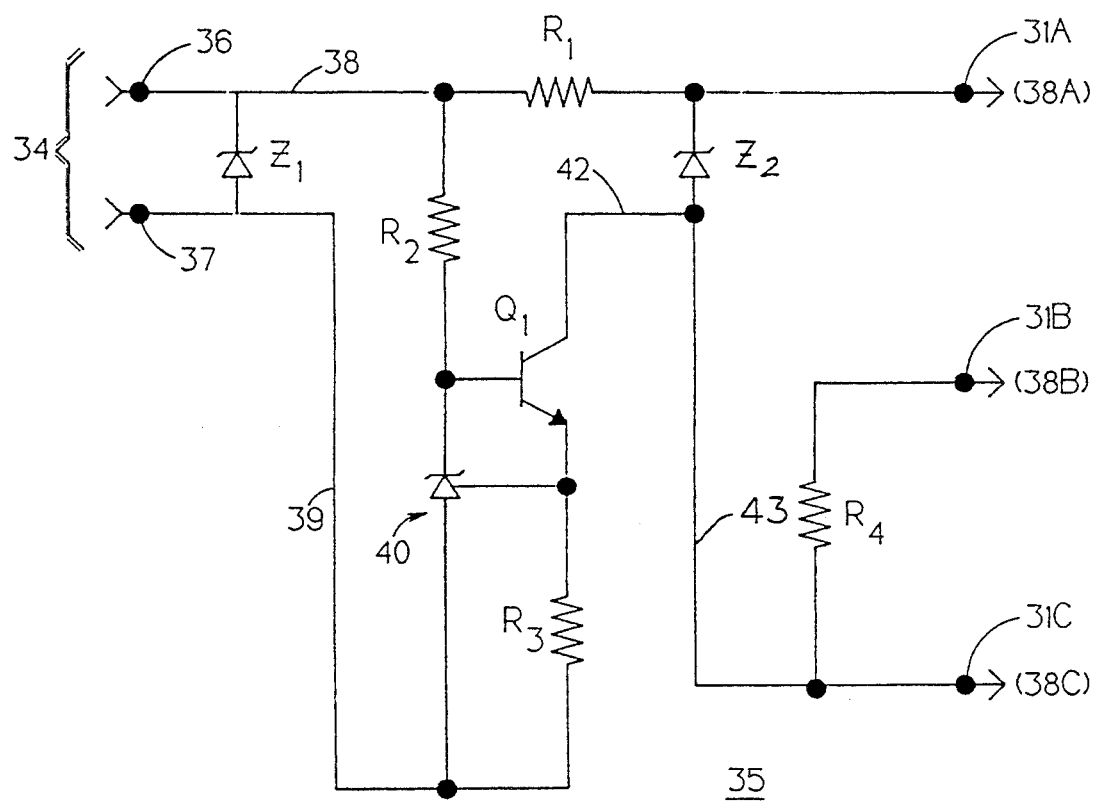
FIG. 4 is a diagrammatic representation of the components within the printed circuit board of FIG. 3.

As shown in FIG. 3, the test plug 17 includes a cover 29 with an access opening 30 which allows external connection between the power plug 47 (shown earlier) for providing operating power to the printed circuit board 32 mounted within the case 56, by means of the jack connector 34. The printed circuit board 32 connects with the contacts 38(A-C) formed within the bottom of the case by means of pads 31(A-C), which electrically connect with the trip unit printed wire board 18 shown in FIG. 2 in the manner described within aforementioned U.S. Pat. No. 4,728,914. The test circuit 35 contained within the printed wire board 32 is depicted in FIG. 4.

Figure 5:
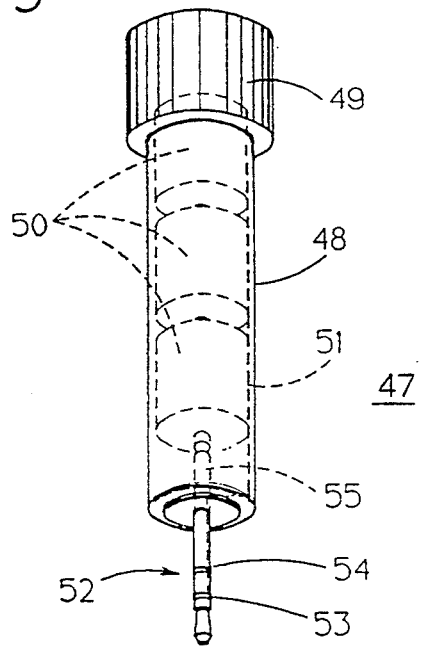
FIG. 5 is an enlarged front view of the power pack to be used with the test plug of FIGS. 1-3.

A pair of input terminals 36, 37 connect with the power plug 47 of FIG. 5 by means of the power jack 34 to provide DC power to the positive and negative rails 38, 39. The first varactor or zener diode $Z_1$ provides voltage regulation to the DC voltage appearing across the rails. The voltage divider consisting of resistors $R_1$, $R_2$ along with the diode regulator 40 maintain the output of transistor $Q_1$ appearing on conductor 42 at approximately 50 ma to allow the circuit breaker trip unit to receive operating power by connection with terminals 31A, 31C connected with the trip unit by means of contacts 38A, 38C respectively. The zener diode $Z_2$ connecting with the base of transistor $Q_1$ via conductor 42 and with output terminal 31C via conductor 43 maintains the output DC voltage appearing across 31A, 31C at a constant value. The burden resistor $R_3$ connecting between the gate and the anode of the diode regulator 40 outputs a fault-simulated trip current through $Q_1$, conductors 42, 43 and additional burden resistor $R_4$ to output terminal 31B and contact 38B to cause the trip unit 18 to send a trip signal to the trip actuator 19 (shown earlier) to immediately respond and articulate the circuit breaker operating mechanism in the same manner as if an actual fault current had occurred. It is noted that the power plug 47 depicted in FIG. 5 serves to both provide the operational power to the circuit breaker trip unit while simultaneously acting as a switch to provide the fault-simulated trip current. When the test plug is first inserted within the rating plug receptacle in press-fit relation by means of the jack connector 52 at the bottom end of the power plug, a short time period is required for the trip unit to receive operational power before the fault-simulated current can be outputted from the trip unit to the trip actuator. An additional output signal can optionally be outputted to a bell alarm accessory electrically connected with the circuit breaker trip unit to ensure the operation of the bell alarm, if so desired. The DC power is provided to the trip unit by three or four serially-connected batteries 50 inserted within the power pack case 48 via the cover 49 at the top end of the power plug. Electric connection with the negative battery terminals is made by means of the internal conductor 51 while connection with the positive battery terminals is made by means of the internal conductor 55. Connection with the test plug jack connector 34 of FIG. 3 is made by means of the radial conductor bands 53, 54 on the power pack jack connector 52.

A plug-in type test plug arrangement has herein been described which will simulate an actual fault occurrence on an electrical distribution system and electrically interact with the circuit breaker trip unit and trip actuator to articulate the circuit breaker operating mechanism and improve the lubricity of the trip actuator components.

Having thus described our invention, what we claim as Letters Patent is:

1. A circuit breaker trip unit auxiliary power supply plug comprising:

a plastic enclosure having a removable cover at one end thereof;

an electrical jack connector at an opposite end of said enclosure, said jack connector having first and second radial contacts providing external connection;

at least one battery within said enclosure having first and second terminals; and an electrical circuit within said enclosure providing electrical connection between said first and second terminals and said first and second radial contacts said enclosure comprising a first cylinder of a first predetermined dimension and said jack connector comprising a second cylinder of a second dimension, said second dimension comprising a press-fit dimension to a circuit breaker test plug access opening for electrical connection between said first and second terminals and said electrical circuit within a circuit breaker test plug.

* * * * *